United States Patent
Jain (10) Patent No.: US 9,647,869 B2
(45) Date of Patent: May 9, 2017

(54) METHOD AND SYSTEM FOR HOSTING TRANSIENT VIRTUAL WORLDS THAT CAN BE CREATED, HOSTED AND TERMINATED REMOTELY AND AUTOMATICALLY

(75) Inventor: Siddharth Jain, Singapore (SG)

(73) Assignee: PLAYWARE STUDIOS ASIA PTE LTD, Singapore (SG)

(*) Notice: Subject to any disclaimer, the term of this patent is extended or adjusted under 35 U.S.C. 154(b) by 458 days.

(21) Appl. No.: 14/236,904

(22) PCT Filed: Aug. 3, 2012

(86) PCT No.: PCT/SG2012/000278
§ 371 (c)(1),
(2), (4) Date: Feb. 3, 2014

(87) PCT Pub. No.: WO2013/019162
PCT Pub. Date: Feb. 7, 2013

(65) Prior Publication Data
US 2014/0213371 A1 Jul. 31, 2014

Related U.S. Application Data

(60) Provisional application No. 61/514,996, filed on Aug. 4, 2011.

(51) Int. Cl.
*G09B 5/12* (2006.01)
*H04L 29/06* (2006.01)
(Continued)

(52) U.S. Cl.
CPC ...... *H04L 29/06034* (2013.01); *A63F 13/335* (2014.09); *A63F 13/352* (2014.09); *A63F 13/48* (2014.09); *A63F 13/493* (2014.09); *A63F 13/63* (2014.09); *A63F 13/77* (2014.09); *A63F 13/792* (2014.09); *A63F 13/822* (2014.09); *G09B 5/12* (2013.01); *G09B 7/07* (2013.01)

(58) Field of Classification Search
CPC ........ A63F 13/352; A63F 13/60; A63F 13/63; A63F 13/77; A63F 2300/6009; A63F 2300/6018; G09B 9/00; G09B 5/00; G09B 5/08; G09B 5/10; G09B 5/12; G09B 5/14; G09B 7/07; G09B 7/077
See application file for complete search history.

(56) References Cited

U.S. PATENT DOCUMENTS

| 2004/0103137 A1* | 5/2004 | Irving | G09B 7/00 709/200 |
| 2007/0190512 A1* | 8/2007 | Meimer | G09B 5/00 434/322 |

(Continued)

*Primary Examiner* — Damon Pierce
(74) *Attorney, Agent, or Firm* — TIPS Group (57) ABSTRACT

Embodiments of the invention relate to providing a method and system for presenting users with the ability to host a virtual world especially one that is capable of being used in a game based environment for teaching and learning, and more specifically to improving ease of customization, enabling on-demand-usage and facilitating content sharing for hosting private virtual locations on virtualized servers specifically so that multiple discreet virtual worlds can be hosted (automatically and remotely), started or removed on one or more servers simultaneously and independently of each other without affecting the other hosts.

14 Claims, 6 Drawing Sheets

(51) Int. Cl.
 *A63F 13/63* (2014.01)
 *A63F 13/48* (2014.01)
 *A63F 13/822* (2014.01)
 *A63F 13/335* (2014.01)
 *A63F 13/792* (2014.01)
 *A63F 13/352* (2014.01)
 *A63F 13/77* (2014.01)
 *A63F 13/493* (2014.01)
 *G09B 7/07* (2006.01)

(56) References Cited

U.S. PATENT DOCUMENTS

| | | | |
|---|---|---|---|
| 2008/0050715 A1* | 2/2008 | Golczewski | G06Q 10/06311 434/350 |
| 2009/0106347 A1 | 4/2009 | Harwood et al. | |
| 2010/0030854 A1 | 2/2010 | Dolbier et al. | |
| 2011/0107239 A1 | 5/2011 | Adoni et al. | |
| 2013/0031238 A1* | 1/2013 | Grossklas | H04L 43/0817 709/224 |

* cited by examiner

METHOD AND SYSTEM FOR HOSTING TRANSIENT VIRTUAL WORLDS THAT CAN BE CREATED, HOSTED AND TERMINATED REMOTELY AND AUTOMATICALLY

BACKGROUND

Technical Field

Embodiments of the invention relate to providing a method and system for presenting users with the ability to host a virtual world, such as in a game based environment for teaching and learning, which is suitable for "pay-as-you go" service.

Description of Related Art

A virtual world is a simulated environment in which users may inhabit and interact with one another via avatars. An avatar generally provides a graphical representation of an individual within the virtual world environment. Avatars are usually presented to other users using a graphical representation depicting a human-like character. Multiple users "enter" a virtual world by logging on to a central server(s) and interact with one another through the actions of their avatars. The actions of a given avatar are typically controlled by the individual using a mouse and keyboard. Virtual worlds provide an immersive environment with an appearance typically similar to that of the real world, with real world rules such as gravity, topography, locomotion, real-time actions, and communication. Communication may be in the form of text messages sent between avatars, but may also include real-time voice chats.

Virtual worlds may be persistent between times when a given user is logged on. A persistent world provides an immersive environment (e.g., a fantasy setting used as a setting for a role-playing game) that is generally always available, and virtual world events happen continually, regardless of the presence of a given avatar. Thus, unlike more conventional online games or multi-user environments, the events within a virtual world continue to occur for connected users even while other users are not actively logged on to the virtual world.

Massively multiplayer online games commonly depict a world very similar to reality, with real world rules and real-time actions, and communication. Players create a character that travels between buildings, towns, and spaces in the worlds to carry out business or leisure activities. Communication is usually textual, with real-time voice communication using VOIP also possible.

Virtual worlds are not limited to games but, depending on the degree of immediacy presented, can encompass computer conferencing and text based chat rooms. Sometimes, emoticons or 'smilies' are available, to show feeling or facial expression. Emoticons often have a keyboard shortcut.

Figure 1A:
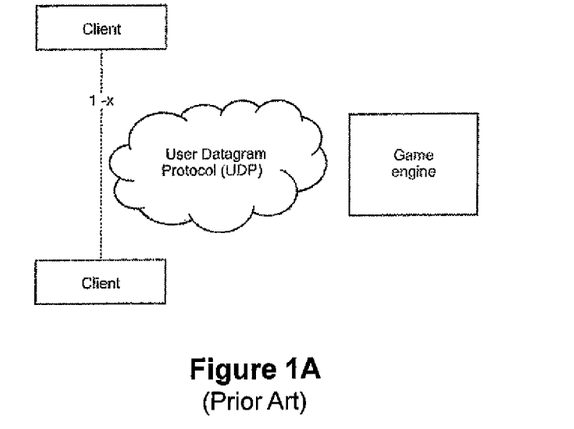
FIG. 1A illustrates a prior art game system operating on a single instance of the game and a single physical computer system.

Conventional massively multiplayer online games (MMOGs) and virtual worlds (such as Second Life), shown by example in FIG. 1A, are unable to scale to support very large numbers of players within a single game/world nor are these designed to facilitate the hosting of multiple worlds with different rule sets and content on the same server. This is because such games and virtual worlds are reliant on a single instance of the game, running on a single physical computer system, acting as the authority for all activities within the game. Typically, the limits to scaling in this scenario are the network bandwidth of the single system and, more significantly, the processor capacity of a game server in the system. The game server, functioning as a game engine, is required to provide the simulation capabilities for every object and player in the virtual world. As the number of players (clients) increases, the computing resources required increases dramatically. Certain game servers, particularly those providing FPS (First Person Shooter) styles of games, are only capable of supporting tens of users due to the complexity of the simulation and the low latency requirements of the game.

Figure 1B:
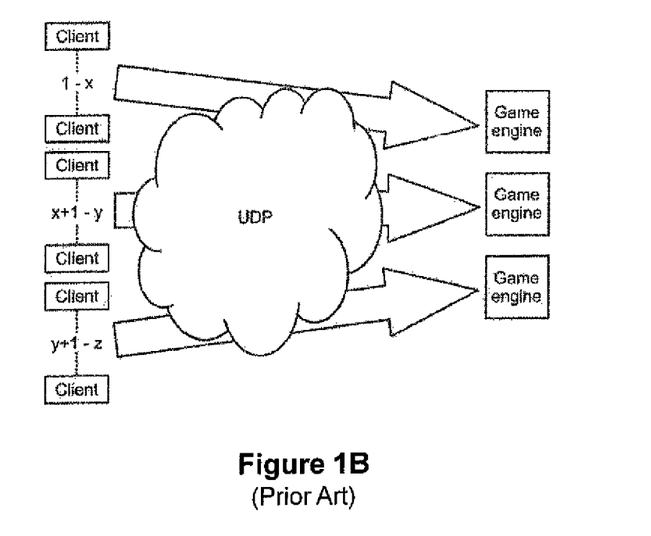
FIG. 1B illustrates a prior art game system implementing a "sharded" architecture.

As shown in FIG. 1B, in an attempt to address such issues, in certain conventional approaches, game systems implement "sharded" architectures that use a number of game servers (game engines), each hosting identical copies of a game. The players (clients) sometimes connect to the game through a common "lobby" service that hides the fact that there are multiple servers hosting the game. A major disadvantage to such approaches is that players are assigned to a particular server (at connection time) for the duration of their game session, and are thus effectively in different games but the hosts are unable to alter the rules or content of the world in any significant way. Also the fact that all players share a common landing page or lobby creates an inelegant problem of herding the visitors to their respective hosts. In effect this alternative also suffers from similar restrictions to the previous system.

Accordingly, an improved method and system of hosting multiple disparate virtual worlds on demand are highly desired.

SUMMARY

Embodiments of the invention relate to providing a method and system for presenting users with the ability to host a virtual world especially one that is capable of being used in a game based environment for teaching and learning, and more specifically to improving ease of customization, enabling on-demand-usage and facilitating content sharing for hosting private virtual locations on virtualized servers specifically so that multiple discreet virtual worlds can be hosted (automatically and remotely), started or removed on one or more servers simultaneously and independently of each other without affecting the other hosts.

One aspect of the invention discloses a system for hosting a virtual world such as in a game based environment for teaching and learning, the system capable of improving ease of customization, enabling on-demand-usage and facilitating content sharing for hosting private virtual locations on virtualized servers specifically so that multiple discrete virtual worlds can be hosted automatically and remotely, started or removed on one or more servers simultaneously and independently of each other without affecting the other hosts, the system comprising: a user database including a plurality of creator clients, a plurality of administrator clients and a plurality of visitor clients, wherein each of the creator clients and the administrator clients includes a separate visitor log to record visitor usage data, wherein the creator clients include a virtual world creation tool; a virtual world server including a memory storage configured to store visitor usage data which is to be removed therefrom after the visitor usage data is exported to the visitor logs of the creator clients and the administrator clients; and an application server including a virtual world storage to store a plurality of newly-created virtual worlds received from the creator clients, a scheduler to receive a plurality of delivery requests of selected ones of the newly-created virtual worlds from the creator clients, wherein the virtual world server is to deliver the selected ones of the newly-created virtual worlds to selected ones of the visitor clients identified in the delivery requests; wherein each of the creator clients, the administrator clients, the visitor clients and the virtual world server includes a graphical asset library which stores a plurality of predetermined properties corresponding to each graphical asset, which are customized for a plurality of operating systems used by the visitor clients.

Another aspect of the invention discloses a method of hosting a virtual world such as in a game based environment for teaching and learning, the method capable of improving ease of customization, enabling on-demand-usage and facilitating content sharing for hosting private virtual locations on virtualized servers specifically so that multiple discrete virtual worlds can be hosted automatically and remotely, started or removed on one or more servers simultaneously and independently of each other without affecting the other hosts, the method comprising: receiving and storing in an application server a plurality of newly-created virtual worlds from a plurality of creator clients; receiving at a scheduler of the application server at least one delivery request of a selected one of the newly-created virtual worlds; retrieving the selected one of the newly-created virtual worlds by a virtual server and delivering the selected one of the newly-created virtual worlds to selected one of the visitor clients identified in the delivery request; temporarily storing visitor usage data of the selected one of the visitor clients identified in the delivery request; exporting the visitor usage data to visitor logs of the creator client and the administrator client associated with the delivery request; and removing the visitor usage data from the virtual world server.

BRIEF DESCRIPTION OF THE DRAWINGS

Embodiments of the invention are disclosed hereinafter with reference to the drawings, in which.

DETAILED DESCRIPTION

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

Figure 2:
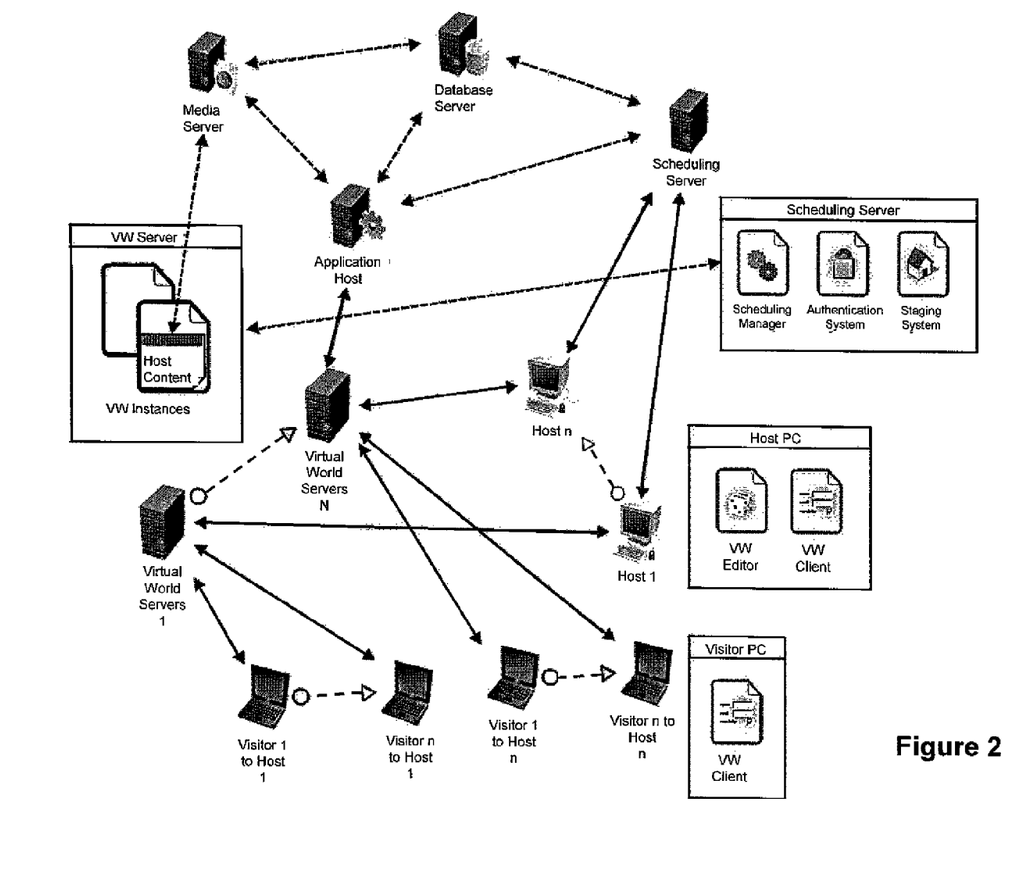
FIG. 2 illustrates a network map of a virtual world system according to the invention.

FIG. 2 shows a functional block diagram of a virtual world system embodying aspects of the present invention in a network map. Various Software components are shown, running on the various nodes of the network in use by various roles a user can play in the system. The diagram also names the software process components running on the various servers that comprise the system.

As the overarching system is developed under a cloud based SOAP architecture, the system is compartmentalized based on coherent processes running independently towards a unified experience. Ideally such a system is hosted on the internet with inter-server communication happening across high-speed LAN networks. The databases in the current system are maintained as unique entities in SAN storage which is in itself structured in a RAID configuration. It is evident that the entire system can be run on a closed LAN/WAN network if desired.

The various component software and functions of the system communicate with each other over the various protocols described in FIG. 2. The packets of communication comprise predominantly the synchronization between the simulation and the ghosting but also comprise in part of the log of visitor activity in the virtual worlds. Between the scheduling and application server, the communication is predominantly the activity of the creator and administrator with the database of the in-stasis virtual world and the accounting application. In part this activity may also be the result of the application of the business intelligence processes available to the creator and administrators for the examination of the visitor usage logs.

Figure 3A:
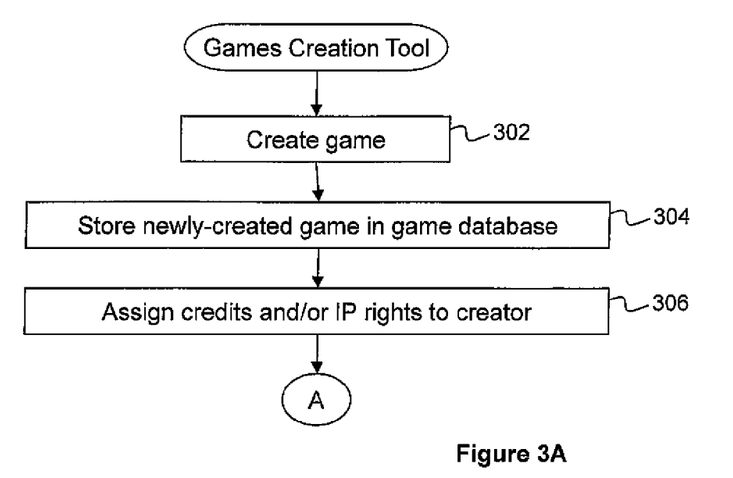
FIG. 3A illustrates a flow sequence for a virtual world creation.

Reference is made to FIG. 3A which illustrates a virtual world or game creation process.

A Game Creation tool is provided for creators, e.g. teachers, educators, etc. The Game Creation tool may be provided as a visual Graphical User Interface (GUI) tool. The GUI tool is designed to be user-friendly for creators who may not be inclined to writing program code. The Game Creation tool and its contents may be made available to view for free. This will enable novice creators to quickly learn from the efforts of master creators.

A creator writes or creates a game using the Game Creation tool. The tool may include, but not limited to, Pre-created Themes, Avatars, Non-Playing Characters. The tool may allow the creator to add content to the game in the form of text, audio, video as well as in-game hyperlinks.

Once a game is created, the newly-created game may be stored in a Game Server/Database. The Game Server(s)/Database(s) may store various games created by various parties, which may be made available for viewing by any interested party. Intellectual Property ownership in each game may be assigned to the creator of the respective game in recognition of his creativity and efforts.

To further reward the creator of the game, the creator may be credited with a usage or license fee for creating a game and/or when his created game is delivered to others, such as for modification of the game to create another game or delivery to a virtual classroom. The fee may be in the form of "delivery hours".

Figure 3B:
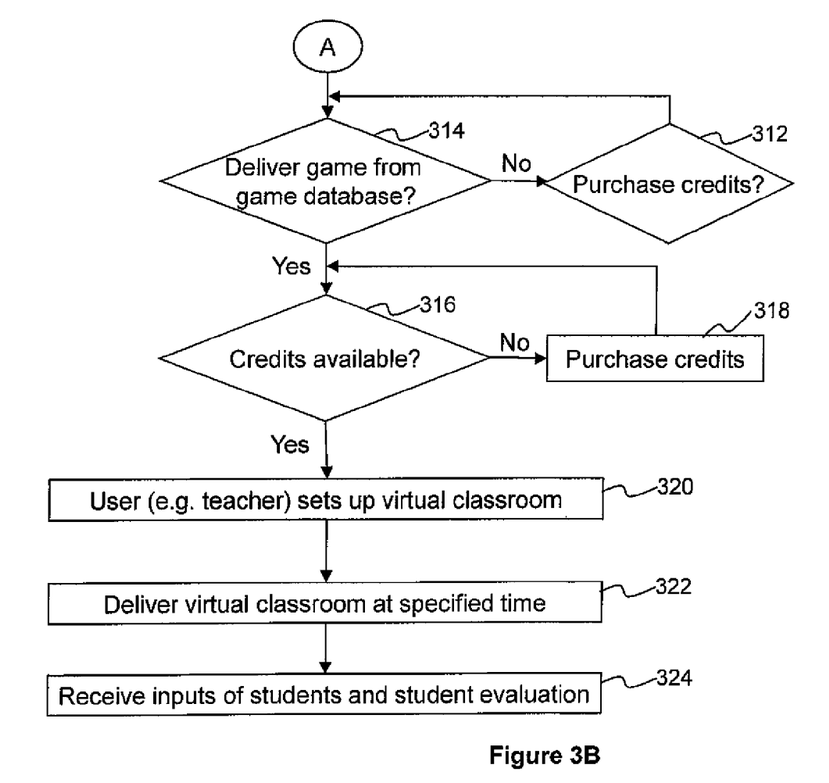
FIG. 3B illustrates a flow sequence for a virtual world delivery in a classroom.
Figure 4:
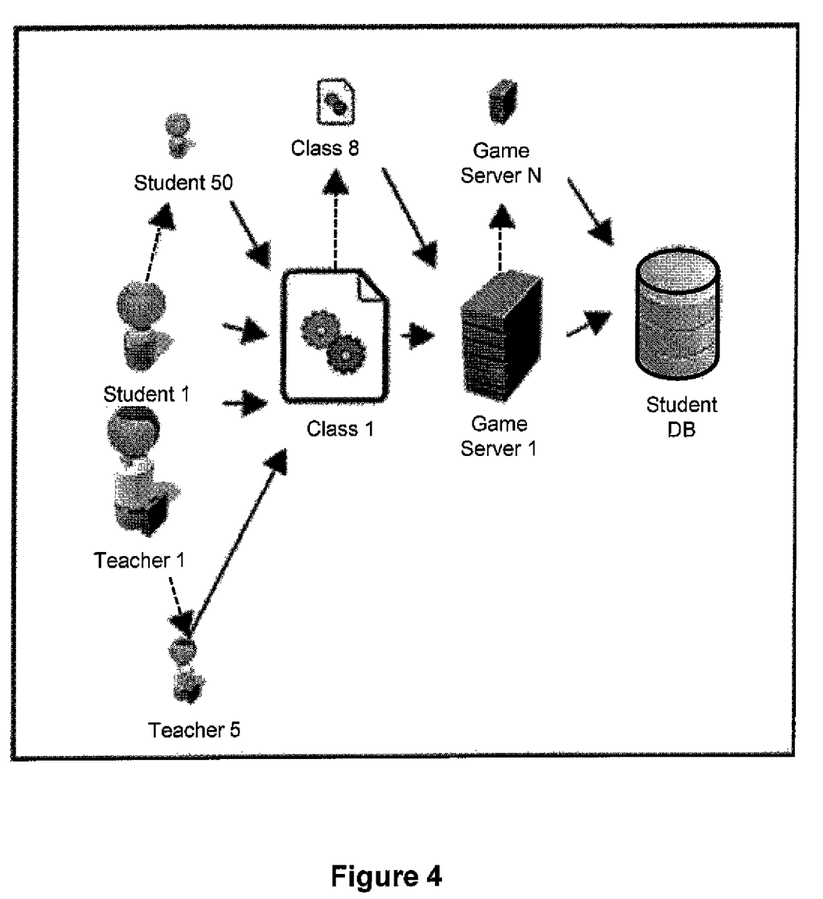
FIG. 4 illustrates a system architecture of a virtual world game delivery system according to the invention.

Reference is made to FIG. 3B which illustrates a virtual world or game delivery process, and to FIG. 4 which illustrates a system architecture of the virtual classroom.

In order to deliver a game from the Game Server to a user, e.g. teacher, school, etc, the user is required to have sufficient credits, e.g. "Delivery Hours". The user or an organization associated with the user may pre-purchase credits from the Game Service Provider. Pricing may be dependent on the number of delivery hours. There may be pricing economies for larger purchases. The user will be given administrator rights to use the Delivery Hours upon purchase of credits.

When a user (e.g. teacher) requests for a specific game to be delivered to a virtual classroom, the user's credits may be checked for sufficiency. Credits may be purchased if the user has insufficient credits.

The user may set up a virtual classroom by way of an online portal provided by the Game Service Provider. Particularly, the user may specify the game to be delivered, the date, time and time duration of the game delivery, and/or number of students. It is to be appreciated that other parameters may be required. The user may request delivery of a game that he has created or another game created by others. Apart from managing delivery requests, the online portal may manage cancellation requests, purchase of credits, adjustment of credits after booking a virtual classroom, and any other necessary administrative procedures. If student evaluation is required, the user may import the students' profiles, e.g. school name, student name, student identification number, email address) for setting up the virtual classroom. The imported student profiles may be stored in a Student Database (FIG. 4).

As illustrated in FIG. 4, multiple virtual classrooms may be set up by various users (e.g. teachers) to allow access by various students. The virtual classrooms may be scheduled concurrently or at different times. The number of concurrent students attending each virtual classroom may be varied. At the scheduled date and time, the specified game is delivered to the specified virtual classroom. The students attending the virtual classroom may be physically at a same location or at different locations with online access.

If student evaluation is required, inputs from students attending the virtual classroom may be received during the game delivery to be stored by the Student Database. The inputs and/or resultant evaluation outcome may be linked or associated with the respective student profile in the Student Database and stored therein. The students may be evaluated on, for example, his understanding of the learning objectives around which the game is designed, and/or his engagement during the game delivery.

The above virtual world creation and delivery processes provide the following advantages:

Once a game is created, the games will remain available and stored in a game server even if the classes are not scheduled for delivery. This allows sharing of game resources. (This is called in-stasis storage)

The user, e.g. school, does not need to set up an annual subscription with a Game Service Provider for the delivery of the games. The school/teacher may purchase credits, e.g. "Delivery Hours" from the Game Service Provider, which may be used on a "Pay-per-Use" basis The creator, e.g. teacher, who creates the game content may be recognized as the Intellectual Property owner for the content and may be rewarded for usage of his game by other users, e.g. teachers.

Figure 5:
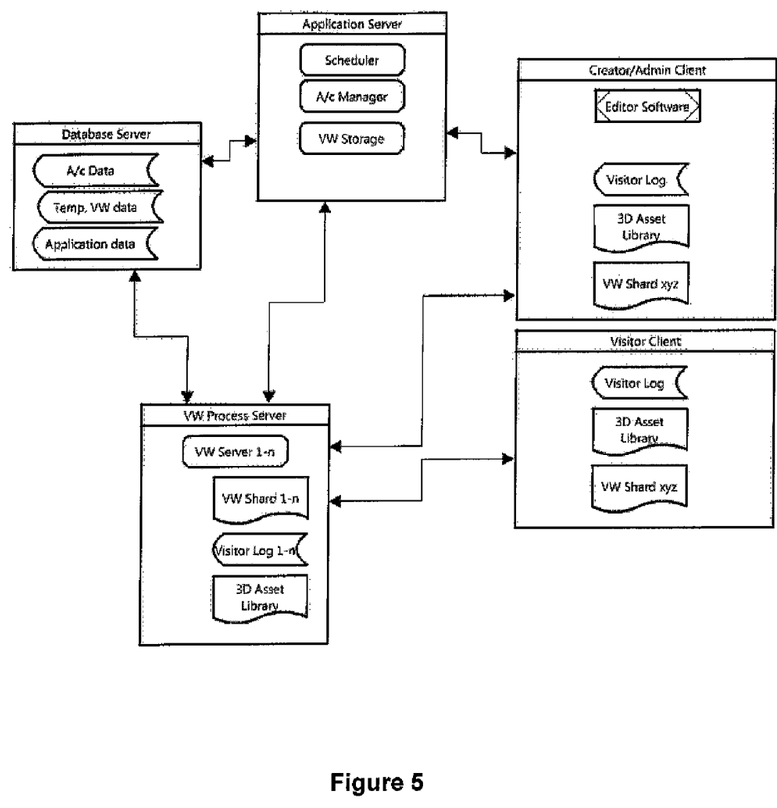
FIG. 5 demonstrates the system of the abstraction of the underlying virtual world server from the user database, virtual world graphical assets, logical objects, sharded virtual worlds and user lobbies, accounting units and also the abstraction of each of these from the others.

Reference is made to FIG. 5 which demonstrates the system of the abstraction of the underlying platform (virtual world server) from the user database, virtual world graphical assets, logical objects, sharded virtual worlds and user lobbies, accounting units and also the abstraction of each of these from the others.

The abstraction is made at several levels—following closely both the System-Oriented Application Programming (SOAP) and Objected Oriented Programming System (OOPS) methodologies.

This abstraction allows for the system to service discrete custom-built 3D virtual environments on a unified platform while retaining independent record and process for each of the virtual environments.

The User database abstraction in itself consists of dividing user categories to administrator, creator, moderator and visitor in such a form that while there is visitor non-registration to the platform, the visitor usage data is captured and available to administrator and creator accounts. The intent is to allow the game creator and administrator (usually teachers) to closely design and control the experience of visitor (usually students). The abstraction also allows proper tracking and allocation of server and bandwidth resources permitting the system to account and charge for each temporal unit of such activity. This abstraction necessitates multi-instancing of the platforms database such that each individual virtual world's usage and data logs are independently processed and individually recorded in transient sub-database instances. This is achieved by creating a master record of creator and administrator activity accounts and linking them to the scheduled virtual world transient data as created by the platform as needed. The above embodies the platform's transient memory storage of the visitor data and illustrates how it is connected to and administered by the administrator and the creator accounts.

The above abstraction of usage data allows for the system to recognize when the virtual world instances are active and facilitates that the accounting units are linked to administrator and creator accounts usage of the scheduled platform time and not to the Virtual World in-stasis storage or visitor activity. The intent is for the creation of and in-stasis storage of virtual world shards online with an option to the creator and administrator to share their in-stasis worlds with other creators and administrators with or without need for monetary compensation and/or credit ascription.

The platform facilitates the creators and administrators with creation tools to author through non-scripting or logical programming interpreted instructions for the virtual world rules by Graphical User Interface schema. This is done in-part by the abstraction of the 3D Libraries as described in the next section from the logical objects and further by abstracting the logical objects themselves from the system's databases. The platform utilizes a system whereby, logical objects and logical coordinates in the virtual world can have definition and relationship parameters described by the user in a graphical user interface environment merely by tweaking values and constructs already pre-defined by the platform.

This abstraction also ensures that the user database from user lobbies are created in such a form that the creator and administrator can specify, or control and dictate access and visitor privileges as per their discretion. This is necessary and desirable as the accounting (billing) units of usage are linked to the discretion of the creator and administrator and not the visitors. Since the platform does not intend to charge visitors directly and individually for their usage, rather it intends that the creator and administrators be promoters and controllers and hence accountable to the scheduling system.

This system facilitates that multiple, concurrent disparate virtual world shards run on the same CPU server core running as unique and discrete processes on the unified underlying software platform. This is to ensure that resource consumption for each virtual world is accurately and separately recorded.

It is intended that the creators and administrators can share their virtual worlds not currently utilizing server or bandwidth resources on the platform, rather present as the storage in-stasis. The individually created disparate virtual worlds in unconnected, remote but retrievable state are stored therefore in the creator and administrator database and may have their own accounting schema unconnected to the present schema employed for the accounting of the consumption of the server and bandwidth resources as per the scheduling engine.

This above abstraction as described in FIG. 5 also results in a desirable temporal incoherence on scheduled awakening of the virtual world shards retrieved from the in-stasis from their user activity logs stored in the database based on the discretion of the virtual world creators. This allows for unique visitors accessing the virtual world at different times to have singular experiences of them.

The system makes use of ghosting and simulation model of connectivity in such form that neither the client of the creator nor the administrator nor the visitor or the server and/or database of the system itself creates a permanent record of the visitor activity log after analytics and export by the creator or administrator. The ghosting and simulation model assumes that the server runs a unique and complete simulation of the virtual world in such isolation that each of the visitors are maintained as individual entities with a limited sphere of influence in the 3D co-ordinate space of the simulation. Each visitor is running a ghost of the said simulation on their client which does not compute any influence of any object in the ghosting with any other object in the ghosting. The server from the simulation updates continuously of each of the ghosting instances in all of the visitor clients in such form that they only have information and updates and therefore a rendered visualization of the virtual world simulation as in their direct area of influence.

Figure 6:
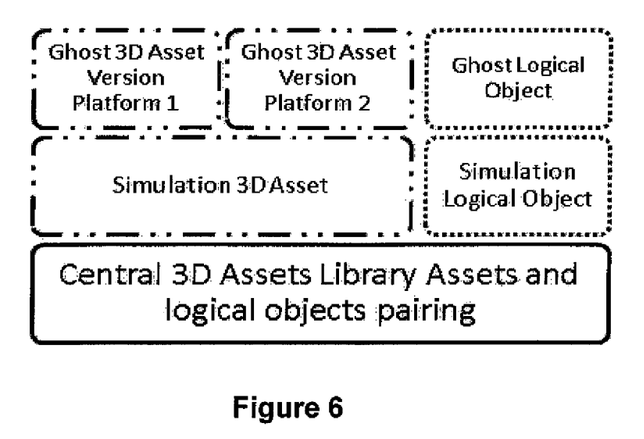
FIG. 6 illustrates abstraction of 3D assets.

Reference is now made to FIG. 6.

The system allows a grouping of graphical libraries and assets as themes and tiles with transposed, translated coordinate information relative to each other and point-of-origin for use as logical objects in creator-authored virtual world shards. This is done in such form that the transposition and translation information with volume information in coordinate space is maintained for each object in the tile and theme as described, independently of the 3D graphical asset that may represent it in the simulation at the server or the ghosting at the client.

This abstraction also allows the use of graphical assets stored at the visitor's client hardware independent from the virtual world shard authored by the creator in such form that the assets can have plural usage and meaning in a specific context. Since the logical information about the transposition and translation and volume in the coordinate space is not linked to a specific 3D asset, the same asset may be linked to several such logical objects. This allows the abstraction of logical objects from virtual world shards, 3D graphical asset libraries in such form that the same logical object can exist as multiple 3D graphical assets in disparate virtual world shards based on context specified by the creator.

The system facilitates the platform in making addition of 3D graphical asset libraries to the system by a remote, automate, silent update methodology in such form that different creator and administrators can be restricted or allowed usage of such assets in their virtual world shards. This happens because of the abstraction of the 3D Asset library from the logical object consolidation authored by the creator and administrator using the Graphical User Interface tool to define the virtual world as viewed by the visitors, even though the 3D graphical asset library can be stored on their client machine.

Figure 7:
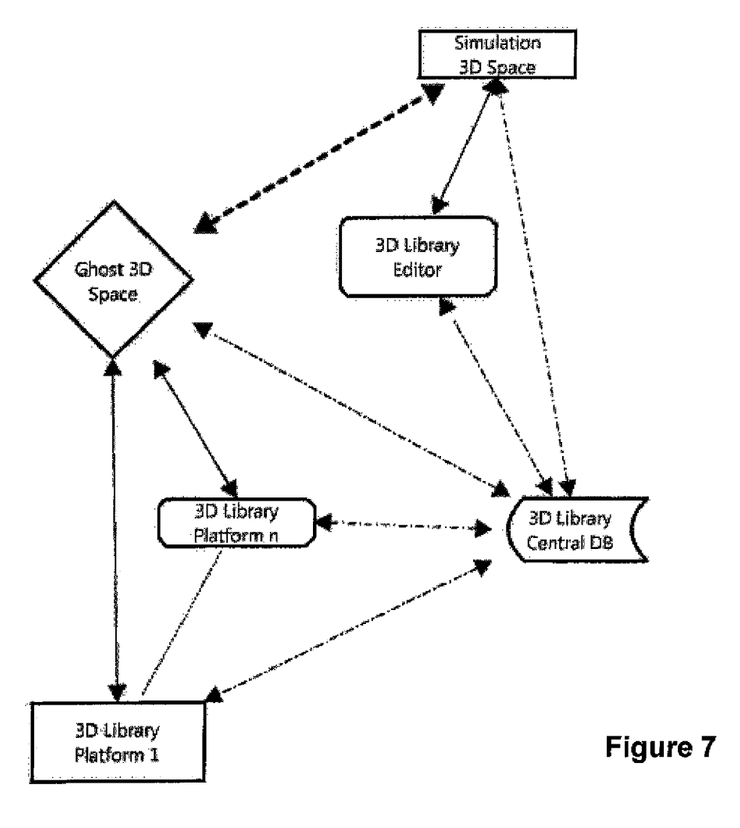
FIG. 7 illustrates abstracted multi-instance 3D library management.

Reference is now made to FIG. 7.

The above abstraction of the graphical asset libraries from the logical objects also allows for the underlying platform to recognize remote and notional 3D asset libraries, user databases and visitor activity logs as accountable virtual world shards based on creator and administrator scheduling. This is most evident in this abstraction where the 3D graphical assets for each operating system or hardware platform are independently optimized for that particular platform in such form that they may have predetermined properties, e.g. unique geometry, visual or physics properties, interface and control mechanics customized to that platform.

The system maintains the logical cohesion in the authoring environment of the above mentioned disparate 3D graphics asset libraries optimized across multiple visitor client operating environments. It does so by maintaining and indexing the instance information for each 3D graphical asset as it appears on the various platforms.

As is known to those skilled in the art, the aforementioned example embodiments described above, according to the present invention, can be implemented in many ways, such as program instructions for execution by a processor, as software modules, as computer program product on computer readable media, as logic circuits, as silicon wafers, as integrated circuits, as application specific integrated circuits, as firmware, etc. Though the present invention has been described with reference to certain versions thereof; however, other versions are possible. Therefore, the spirit and scope of the appended claims should not be limited to the description of the preferred versions contained herein.

What is claimed is:

1. A system for hosting a virtual world such as in a game based environment for teaching and learning, the system capable of improving ease of customization, enabling on-demand-usage and facilitating content sharing for hosting private virtual locations on virtualized servers specifically so that multiple discrete virtual worlds can be hosted automatically and remotely, started or removed on one or more servers simultaneously and independently of each other without affecting the other hosts, the system comprising:

a user database including a plurality of creator clients, a plurality of administrator clients and a plurality of visitor clients;

a virtual world server including a memory storage configured to store visitor usage data; and an application server including a virtual world storage to store a plurality of newly-created virtual worlds received from the creator clients, and a scheduler to receive a plurality of delivery requests of selected ones of the newly-created virtual worlds from the creator clients, wherein the virtual world server is to deliver the selected ones of the newly-created virtual worlds to selected ones of the visitor clients identified by the creator clients in the delivery requests at scheduled dates and times, and is to host the newly-created virtual worlds as discrete instances;

wherein each of the creator clients, the administrator clients, the visitor clients and the virtual world server includes a graphical asset library which stores a plurality of predetermined properties corresponding to each graphical asset, wherein the predetermined properties are customized based on a respective operating system or hardware platform used by each of the visitor clients; and wherein the system is configured to remove the visitor usage data from the memory storage after the visitor usage data is exported to visitor logs of the creator clients and administrator clients associated with the delivery requests.

2. The system of claim 1, wherein the virtual world server is configured to host discrete instances of the newly-created virtual worlds concurrently and within a single CPU core.

3. The system of claim 1, wherein the application server includes an account manager configured to assign credits and/or intellectual property rights of one of the newly-created virtual worlds to a corresponding creator client which created the one of the newly-created virtual worlds.

4. The system of claim 1, wherein the application server includes an account manager is-configured to calculate accounting units based on delivery duration of the selected ones of the newly-created virtual worlds.

5. The system of claim 1, wherein the predetermined properties include geometry, visual or physical properties, interface and control mechanics of a graphical asset.

6. The system of claim 1, wherein the creator clients and/or the administrator clients are configured to specify privileges of the visitor clients.

7. The system of claim 1, wherein the virtual world storage is configured to allow sharing of the newly-created virtual worlds among the creator clients and administrator clients.

8. A method of hosting a virtual world such as in a game based environment for teaching and learning, the method capable of improving ease of customization, enabling on-demand-usage and facilitating content sharing for hosting private virtual locations on virtualized servers specifically so that multiple virtual worlds can be hosted automatically and remotely, started or removed on one or more servers simultaneously and independently of each other without affecting the other hosts, the method comprising:

having a user database including creator clients, administrator clients and visitor clients;

receiving and storing in an application server a plurality of newly-created virtual worlds from creator clients;

receiving at a scheduler of the application server a plurality of delivery requests of selected one of the newly-created virtual worlds;

delivering the selected one of the newly-created virtual worlds to selected one of visitor clients identified by the creator clients in the delivery request at scheduled dates and times, and hosting, at a virtual world server, the newly-created virtual worlds as discrete instances;

storing, at a virtual server, visitor usage data of the selected one of the visitor clients identified in the delivery request;

exporting the visitor usage data to visitor logs of the creator clients and the administrator clients associated with the delivery requests;

removing the visitor usage data from the virtual world server; and storing a graphical asset library at each of the creator clients, the administrator clients, the visitor clients and the virtual world server, wherein the graphical asset library includes a plurality of predetermined properties corresponding to each graphical asset, which are customized based on respective operating system or hardware platform used by each of the visitor clients.

9. The method of claim 8, wherein the predetermined properties include geometry, visual or physical properties, interface and control mechanics of a graphical asset.

10. The method of claim 8, further comprising: hosting at the virtual world server discrete instances of the newly-created virtual worlds concurrently and within a single CPU core.

11. The method of claim 8, further comprising: having an account manager of the application server assign credits and/or intellectual property rights of one of the newly-created virtual worlds to a corresponding creator client which created the one of the newly-created virtual worlds.

12. The method of claim 8, further comprising: having an account manager of the application server calculate accounting units based on delivery duration of the selected ones of the newly-created virtual worlds.

13. The method of claim 8, further comprising: specifying privileges of the visitor clients by the creator clients and/or a plurality of the administrator clients.

14. The method of claim 8, further comprising allowing sharing of the newly-created virtual worlds among the creator clients and administrator clients.

* * * * *